Jan. 13, 1948. A. KALITINSKY 2,434,319
PUSHER INSTALLATION FOR TURBINE DRIVEN PROPELLERS
Filed Jan. 30, 1945
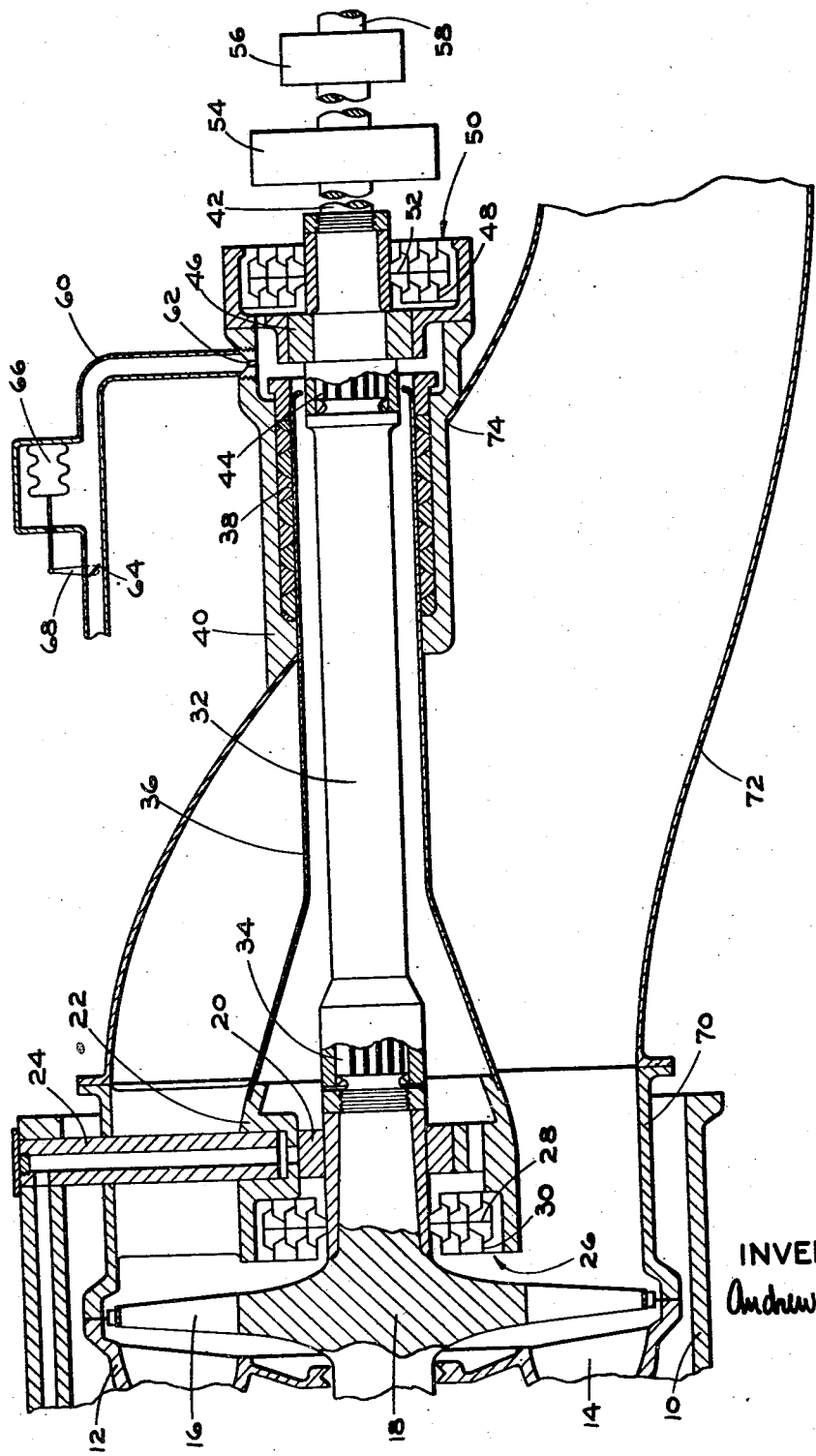
INVENTOR
Andrew Kalitinsky Patented Jan. 13, 1948

2,434,319

UNITED STATES PATENT OFFICE 2,434,319

PUSHER INSTALLATION FOR TURBINE-DRIVEN PROPELLERS

Andrew Kalitinsky, Eagleville, Conn., assignor to United Aircraft Corporation, East Hartford, Conn., a corporation of Delaware Application January 30, 1945, Serial No. 575,338

2 Claims. (Cl. 253—39)

This invention relates to a pusher installation for a turbine driven propeller for aircraft.

If the power gas from the turbine is discharged through a thrust nozzle for additional thrust the turbine is preferably arranged so that the gas may reach the nozzle from the turbine without a substantial change in direction. When the power plant uses a pusher propeller connected to the turbine shaft, gas from the turbine may be discharged around the connecting shaft so that heat shielding may be advantageous to prevent overheating of the shaft. A feature of this invention is an arrangement of a heat shield for the projecting shaft at the discharge end of the turbine.

Another feature is the circulation of cooling air between the shaft and the shield. Another feature is the maintenance of a pressure within the shield to cause leakage of air from this space past the labyrinth seal that surrounds the turbine shaft at the discharge end.

At high altitudes the atmospheric pressure is so low that if a lubrication system is vented to atmosphere the oil tends to foam. A feature of this invention is the inclusion of the shaft bearing within the space to which cooling air is supplied and in maintaining in this space an air pressure which will be independent of altitude and which will be high enough to prevent foaming.

Other objects and advantages will be apparent from the specification and claims, and from the accompanying drawings which illustrate an embodiment of the invention.

The single figure is a sectional view through the installation with the valve for maintaining the desired pressure shown diagrammatically.

The turbine housing 10 may support one or more casing rings 12 having rows of nozzles 14 which alternate with blades 16 on the rotor 18. The turbine may be the type shown in the co-pending application of Cronstedt 486,617 which issued on August 5, 1947 as Patent Number 2,425,177 in which the rear bearing 20 for the turbine is mounted in a housing 22 supported from the main housing 10 by a number of radially extending pins 24.

Between the last stage of the turbine and the bearing 20 is positioned a labyrinth seal 26 which surrounds the shaft and prevents leakage of gas from the turbine into the housing 22. The seal includes rotary elements 28 mounted on the rotor and stationary cooperating elements 30 mounted within the housing 22, thereby forming a number of throttling openings.

An extension shaft 32 is connected to the end of rotor 18 as by a spline connection 34. This shaft is located within a heat shield 36 which engages the mounting 22 at the leading end of the shield and which fits within a seal 38 in a bearing support 40 spaced from the housing 22. A connecting shaft 42 having a spline connection 44 with extension shaft 32 is journaled in a bearing 46 located with the support 40.

Adjacent to bearing 46 the support 40 carries the stationary elements 48 of a labyrinth seal 50 having rotating elements 52 cooperating with the stationary elements. Shaft 42 is connected through reduction gears 54 and counter-rotation means 56 to shafts 58 for a propeller system 58.

The space between the heat shield 36 and the extension shaft 32 forms a chamber within which the bearings 20 and 46 are located. The seals 28 and 50 are located beyond the bearings and permit the introduction of sealing air under pressure through a duct 60 to the chamber. An orifice 62 may be used to control the quantity of sealing air reaching the chamber and the labyrinth seals permit a slow leakage of air past the seals so that the chamber is continually supplied with relatively cool air. Leakage of air past the seal 26 prevents the entrance of the power gas into the seal.

The air supplied to the chamber around the extension shaft may be maintained at predetermined pressure independently of atmospheric pressure. As shown, air from any suitable source such as the compressor which normally forms a part of the power plant passes a valve 64 in duct 60. This valve is controlled from an evacuated bellows 66 through an arm 68. As the pressure increases in duct 60 the bellows tends to move the valve into a position to reduce the flow of air so that a substantially constant pressure is maintained at the orifice 62.

The power gas discharging from the turbine is guided by a substantially cylindrical duct 70 surrounding the rear bearing and seal, and is then diverted laterally by a duct 72 in an opening 74 of which the support 40 is mounted. The heat shield 36 prevents the hot exhaust gas from engaging directly with the shaft 32 and the flow of cooling air through the shield maintains the extension shaft at the desired temperature.

It is to be understood that the invention is not limited to the specific embodiment herein illustrated and described, but may be used in other ways without departure from its spirit as defined by the following claims.

I claim:

1. An axial flow turbine including a housing, at least one row of stationary nozzles carried by said housing, a turbine rotor having a shaft and at least one row of blades adjacent to the nozzles, a bearing for the shaft, a mounting for the bearing supported by the housing, an exhaust duct surrounding said bearing and connected to the discharge end of the turbine, an extension shaft located at least in part within said duct and connected to said turbine shaft, a jacket surrounding and spaced from said shaft and the bearing, a bearing for the extension shaft spaced from the first bearing, a mounting for said extension shaft bearing, a seal located between the first bearing and the row of blades and sealing the space between the mounting and the turbine shaft, a second seal surrounding the extension shaft on the side of the extension shaft bearing remote from the first bearing and sealing the space between the extension shaft and the mounting for the extension shaft bearing, said jacket extending between the bearing mountings and forming with the mountings a chamber extending between the opposite seals, the seals closing the ends of the chamber, and means for introducing a coolant into said jacket at a pressure higher than that of the gas in the exhaust duct to prevent leakage of exhaust gas into said jacket.

2. An axial flow turbine including a housing, at least one row of stationary nozzles carried by said housing, a turbine rotor having a shaft and at least one row of blades adjacent to the nozzles, a bearing for the shaft, a mounting for the bearing supported by the housing, an exhaust duct surrounding said bearing and connected to the discharge end of the turbine, an extension shaft located at least in part within said duct and connected to said turbine shaft, a jacket surrounding and spaced from said shaft and the bearing, a bearing for the extension shaft spaced from the first bearing, a mounting for said extension shaft bearing, a seal located between the first bearing and the row of blades and sealing the space between the mounting and the turbine shaft, a second seal surrounding the extension shaft on the side of the extension shaft bearing remote from the first bearing and sealing the space between the extension shaft and the mounting for the extension shaft bearing, said jacket extending between the bearing mountings and forming with the mountings a chamber extending between the opposite seals, the seals closing the ends of the chamber, and means for introducing a coolant into said jacket at a pressure higher than that of the gas in the exhaust duct to prevent leakage of exhaust gas into said jacket, said seals providing for a small leakage of coolant from within the jacket to provide for the escape of coolant from within the jacket.

ANDREW KALITINSKY.

REFERENCES CITED

The following references are of record in the file of this patent:

UNITED STATES PATENTS

| Number | Name | Date |
|---|---|---|
| 1,559,182 | Rice | Oct. 27, 1925 |
| 1,867,236 | Van Rijswijk | July 12, 1932 |
| 1,878,731 | Thompson | Sept. 20, 1932 |
| 1,882,267 | Wiberg | Oct. 11, 1932 |
| 1,355,652 | Coppus et al. | Oct. 12, 1920 |
| 1,391,645 | Wheeler | Sept. 20, 1921 |
| 1,914,918 | Heermans | June 20, 1933 |
| 2,169,331 | Wechsberg et al. | Aug. 15, 1939 |
| 1,276,154 | Zoelly | Aug. 20, 1918 |